May 4, 1937. C. J. LAUER 2,079,573
MECHANICAL WINDSHIELD WIPER
Filed July 21, 1933 4 Sheets-Sheet 1
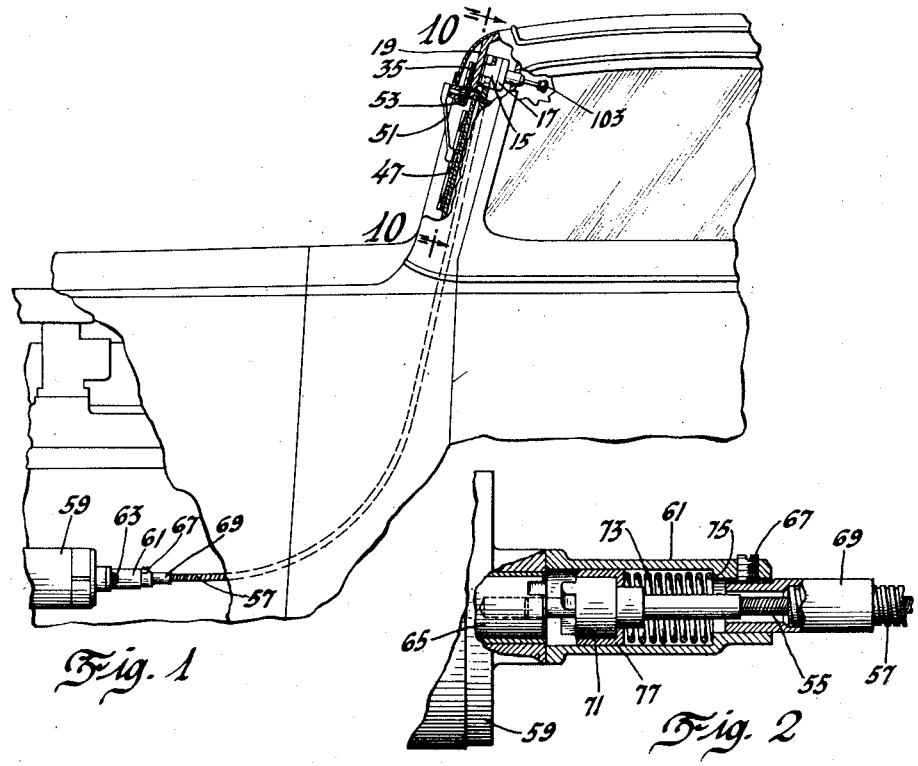
Fig. 1
Fig. 2
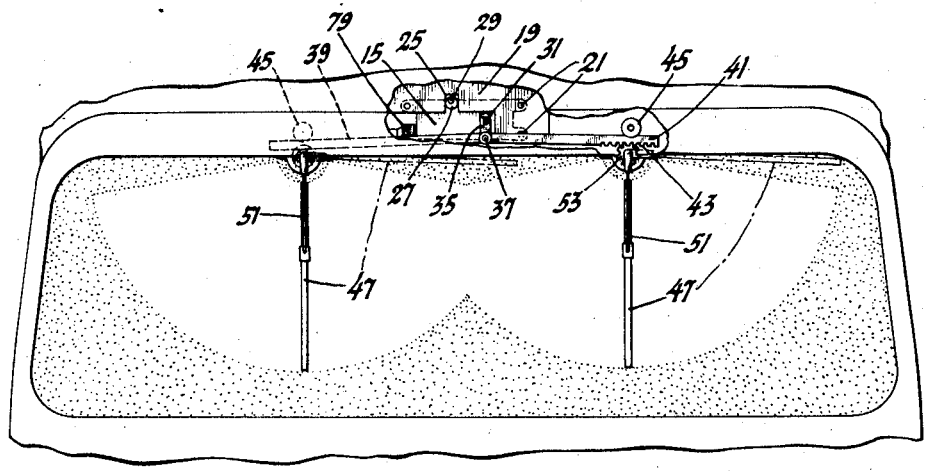
Fig. 3
Inventor
Carleton J. Lauer
By Blackmore, Spencer & Flint
Attorneys May 4, 1937.  C. J. LAUER  2,079,573
MECHANICAL WINDSHIELD WIPER
Filed July 21, 1933  4 Sheets-Sheet 2
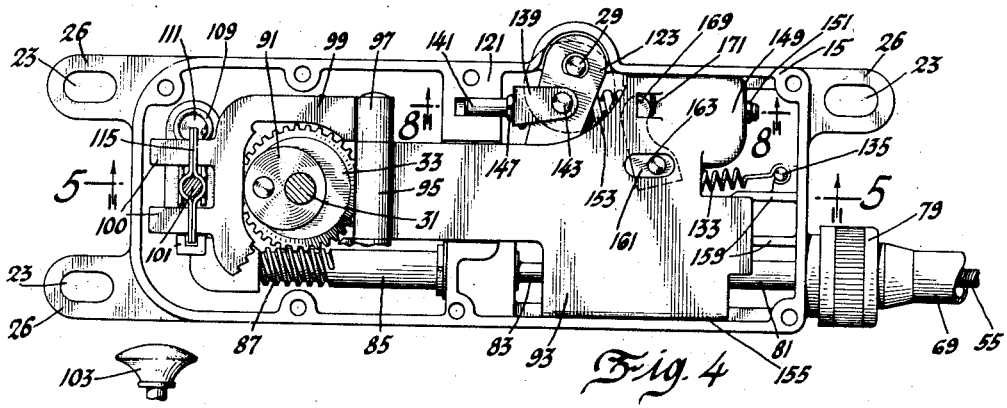
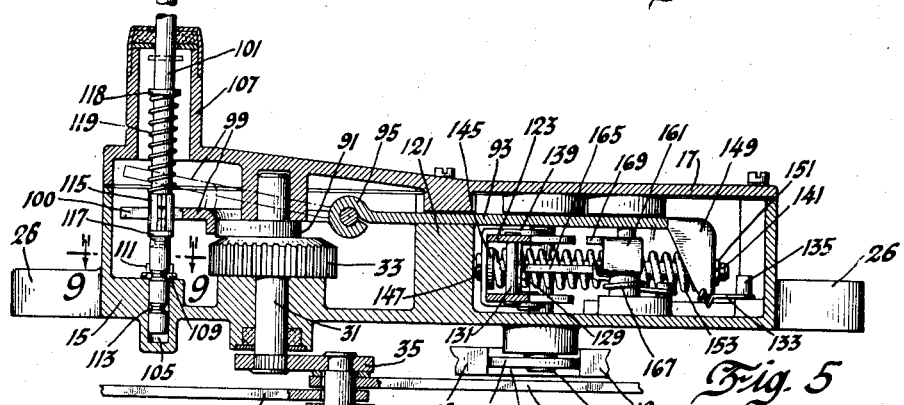
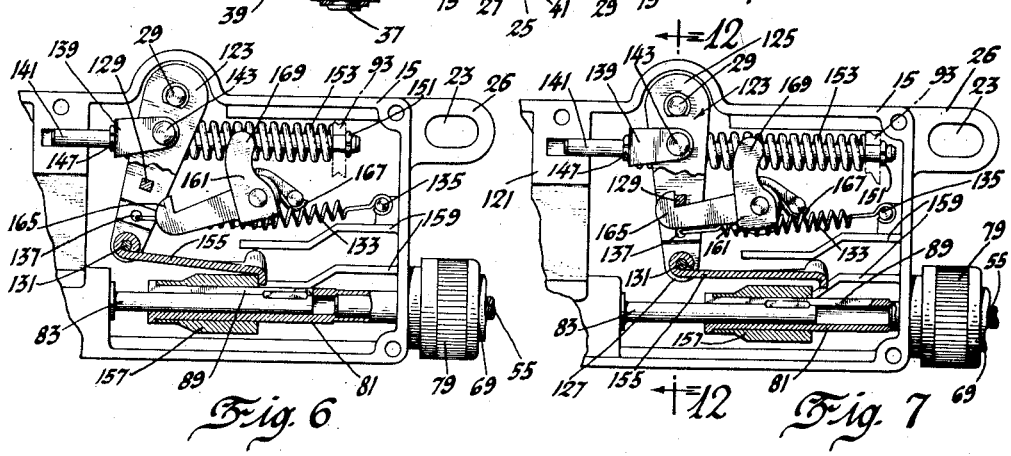
Inventor
Carleton J. Lauer
By Blackmore, Spencer & Flint
Attorneys May 4, 1937.  C. J. LAUER  2,079,573
MECHANICAL WINDSHIELD WIPER
Filed July 21, 1933    4 Sheets-Sheet 3

Inventor
Carleton J. Lauer
By Blackmore, Spencer & Flink
Attorneys

Patented May 4, 1937

2,079,573

UNITED STATES PATENT OFFICE 2,079,573

MECHANICAL WINDSHIELD WIPER

Carleton J. Lauer, Flint, Mich., assignor, by mesne assignments, to General Motors Corporation, Detroit, Mich., a corporation of Delaware Application July 21, 1933, Serial No. 681,501

20 Claims. (Cl. 15—255)

This invention relates to operating mechanism for windshield cleaners.

An object of the invention is to provide an improved mechanical operating connection between the cleaner and an engine-operated shaft.

A further object is to provide operating connections whereby the cleaner movement will be responsive to engine speed.

Another object is to provide a driving connection which shall be idle when the cleaner is out of operation.

Still another object is to provide automatic parking of the cleaner out of the range of vision of the operator.

Other objects and advantages will be understood from the following description with which is associated the accompanying drawings.

In the drawings:

Figure 1 is a view in side elevation and partly broken away showing my invention installed on a motor vehicle.

Figure 2 is a view in longitudinal section of the clutch.

Figure 3 is a view of the windshield in elevation showing a plurality of cleaners and the operating connections for the same.

Figure 4 is a view in elevation of the operating motor with the cover removed.

Figure 5 is a section on line 5—5 of Figure 4.

Figure 6 is a view in elevation, and partly in section of an automatic parking device with its parts in one position of adjustment.

Figure 7 is a similar view with its parts in a second position of adjustment.

Figure 12:
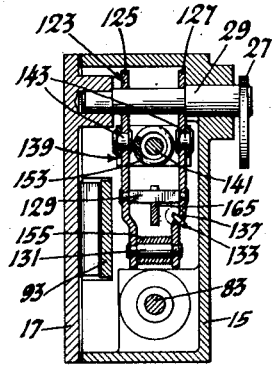
Figure 12 is a section on line 12—12 of Figure 7.
Figure 13:
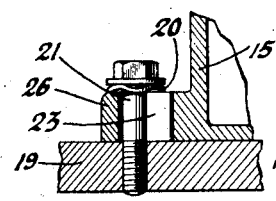
Figure 13 is a section on line 13—13 of Figure 10.

The operating mechanism is housed in a hollow casing 15 and a cover 17. The casing is secured to a fixed plate 19 which may be a part of the windshield header or base or a separate member fixed thereto. The fastening means 21 extends through slots 23 in extensions 26 from the base of the casing 15 permitting a limited longitudinal movement of the casing relative to the plate 19. There may be used resilient clips 20 under the heads of the fastening means 21 to permit a sufficiently free but resiliently resisted movement. Plate 19 is formed with a U-shaped cut-out region 25 dimensioned to receive a cam 27 carried by a shaft 29 journaled in the casing and cover as shown by Figure 12. A sliding movement of casing 15 relative to plate 19 made possible by slots 23 is effected by the rotation of shaft 29 with the cam 27, the latter engaging as fixed abutments the walls of cut-out region 25.

Journaled in the casing and cover is a shaft 31 equipped with a worm gear 33. Outside the casing the shaft 31 carries a crank 35 with a pin 37 to which are connected links 39 and 41. Links 39 and 41 have rack teeth 43 at their remote ends, which ends may be guided by idler rollers 45. Numeral 47 represents the cleaner elements carried by arms 51 at the upper ends of which are toothed members 53 engaging the rack teeth 43. By the rotation of shaft 31 with its crank 35 the links 39 and 41 operate the cleaner elements which, as shown, oscillate simultaneously.

In operation, the shaft 31 is continuously rotated by a flexible cable 55 in a cable housing 57. As shown in Figures 1 and 2, the cable may be driven by the shaft of an engine driven accessory such as the generator 59. A sleeve 61 is secured by fastening means 63 to the end of the generator adjacent the generator shaft 65. A set screw 67 secures a collar 69 on the end of the cable housing 57 to the sleeve. Secured to the end of cable 55 within the sleeve is a clutch element 71 designed as shown to have tooth connection with the end of the generator shaft. To effect that connection a spring 73 engaging a shoulder 75 of the sleeve exerts pressure on a cup 77 surrounding and engaging the clutch element 71.

Fsatening means 79 secures the other end of cable housing 57 to the casing 15. Within the casing 15 the cable is secured by a coupling 81 to a shaft 83, the latter having an enlarged end 85 provided with a worm 87 engaging gear 33. The cable 55 is fixedly secured to coupling 81 and has a sliding spline connection as shown at 89 with the shaft 83. Shaft 83 is mounted in the casing without axial movement and the cable 55 with the coupling 81 may move axially relative to shaft 83 because of the spline connection. Spring 73 biases the cable to a position wherein the clutch element 71 engages the notch in the generator shaft. When so engaged the cable is rotated and the worm and gear elements operate the cleaners, the rotary motion of shaft 31 being converted to oscillating movements of the cleaner arms by the crank and link connections as explained above.

For pulling the cable and releasing the clutch element 71 the following expedient is employed. Fixed on shaft 31 adjacent the gear wheel 33 is an eccentric 91. Slidably mounted between the casing and cover is a stamped slider 93. One end of slider has an eye 95 pivoted to ends 97 of a U-shaped slider extension 99. The bight of the U-shaped region of the extension 99 may lie in the plane of the eccentric or may be swung from the plane thereof. If in the plane of the eccentric, the rotation of the latter will reciprocate the slider with its extension to an extreme position shown by Figure 4. Provision is made whereby the described reciprocation of the slider shall pull the cable and release the clutch element 71. It will be understood from the above description that while the cleaner is in operation the extension 99 is out of the plane of the eccentric and also out of the plane of the slider, this being permitted by the hinge between parts 95 and 99 so that the extension may occupy the dotted line position shown by Figure 5. The extension is moved to and from its positions by a manually operated stem 101 having a knob end 103. This stem is axially slidable in a casing bore 105 and in a cover extension 107. A U-shaped spring 109 is secured to the inner face of the bottom wall of the casing as at 111. Its legs may yieldingly engage in one or the other of two annular slots 113 in stem 101, whereby the stem is yieldingly held in either of its positions of adjustment. Slidably mounted on stem 101 is a fork 115 having arms engaging opposite faces of the two spaced ends 100 of extension 99 (see Figure 4). This fork engages a shoulder 117 on stem 101. The extension 99 is therefore positively rotated from full line to dotted line position as in Figure 5 when the stem is moved outward from the full line position shown. The stem carries in fixed position a spring abutment 118 for a spring 119, the other end of which engages the fork whereby the fork is yieldably held against the shoulder 117. The purpose of the spring may be here explained. The stamped slider 93 with its extension 99 is to be reciprocated from a position to the right of that shown by Figure 4 to the position there shown in the act of disconnecting the clutch and rendering the cleaner inoperative. If the extension is to the right of its position shown by Figure 4, and is pressed down toward the plane of the eccentric 91, it will engage the face of the eccentric in some positions thereof. Under these circumstances the stem 101 continues in the axial movement to its new position (Figure 5), the spring 119 becoming compressed between the now held fork 115 and the inwardly moving abutment 118. When the eccentric has turned sufficiently to permit it the spring 119 presses the extension into the plane of the eccentric, the rotation of which then reciprocates the slider to release the clutch as will be explained.

The position of the eccentric in Figure 4 and Figure 5 defines a rotary of position of shaft 31, which corresponds with the normally extreme position of the cleaner blade at one end of its stroke. The clutch disconnection should therefore be made in such a way that the drive is discontinued just at the moment of reaching the position of Figure 4. In this way the cleaner is out of the range of vision of the operator when not in operation. The mechanism by which this operation is effected may be described as automatic parking and will next be described.

Figure 8:
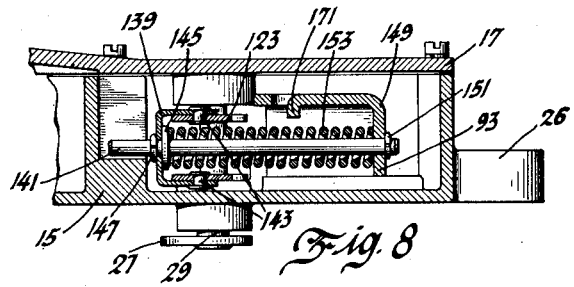
Figure 8 is a longitudinal section on line 8—8 of Figure 4.
Figure 9:
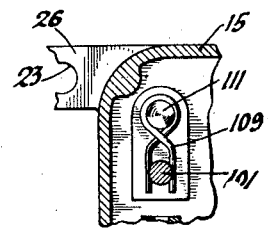
Figure 9 is a section on line 9—9 of Figure 5.
Figure 10:
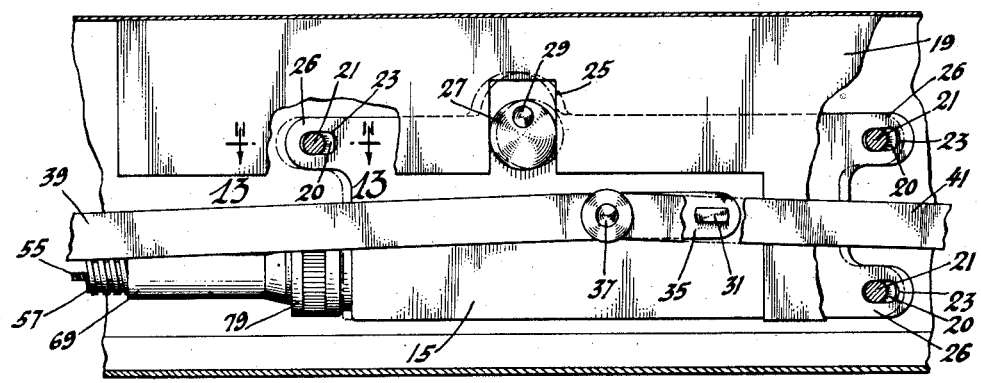
Figure 10 is a view in elevation of the bottom of the casing.
Figure 11:
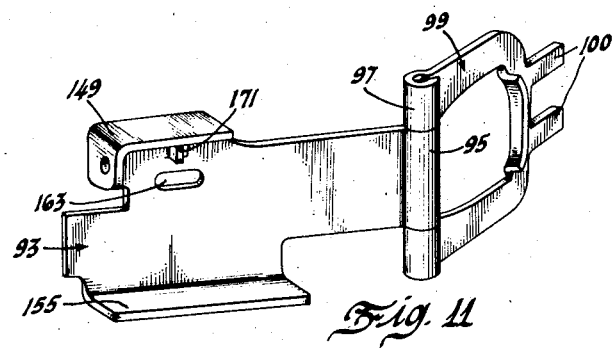
Figure 11 is a perspective of a detail.

The structure designed to operate the cleaner is located for the most part on one side of a casing partition 121. On the other side of the partition is the shaft 29 referred to above. This shaft, in addition to the cam 27 outside the enclosure, has secured thereto a lever 123, this lever being within the enclosure and formed of two arms 125 and 127 as shown by Figure 12. Joining the arms is a pin 129 and a second pin 131. A spring 133 is anchored to the casing at 135 and to the lever at 137. This spring biases the lever to its extreme position of counter-clockwise rotation. Slidable through the bottom of a yoke 139 is a spindle 141 reciprocable in partition 121. The arms of the yoke are pivoted to the sides 125 and 127 of lever 123 at 143. The spindle 141 is positioned relatively to the yoke by a flange 145 and a retainer 147. The slider 93 has a bent over portion 149 having an end slidably engaging the spindle and normally engaging an abutment 151 on its end. A relatively heavy spring 153 surrounds the spindle 141 and engages the flange 145 in the bight of the yoke and the end portion 149 of slider 93 as shown by Figure 8. The bent over portion 149 and an opposite bent portion 155 serve to guide the slider in its reciprocating movements in the casing. To the lower end of the lever is pivoted what is termed a rake 155. The end of the rake is shaped to engage and reciprocate an abutment 157 secured to the connecter 81. Such reciprocation is to pull the cable and release the clutch. This action occurs as the result of clockwise rotation of lever 123. Upon the reverse movement of the lever the rake is released from its engagement with the abutment 157. This separation may be accomplished in other ways but is shown as brought about by guide flanges 159 on the wall of the casing (see Figure 7). The lever 123 is swung counter-clockwise by spring 133, thereby releasing the rake 155 and permitting the spring 73 to pull the cable and engage the clutch.

A pawl 161 is pivoted to the casing and cover, its pivot pin passing through an elongated opening 163 in the slider to accommodate the reciprocation thereof. One arm of the pawl is formed with a hook 165 to engage the pin 129 under the influence of a torsion spring 167 encircling the pivot pin of the pawl. The other arm 169 of the pawl 161 is positioned to be engaged by a lug 171 on the slider to rock the pawl as the slider reciprocates (to the left as shown) and release the hook from the pin. The operation of the mechanism is as follows. When the handle or knob 103 is pulled out the extension 99 is moved to the dotted line position of Figure 5 as a result of which, rotation of shaft 31 does not affect the slider because the extension is out of the plane of the eccentric 91. Spring 133 has swung lever 123 counter-clockwise and rake 155 has been removed from contact with the cable carried abutment 157 with the result of permitting clutch element 71 to engage under the influence of spring 73. The driving train is therefore complete and the cleaner elements are oscillated by links 39 and 41 as the shaft 31 rotates. The mechanism to the right of partition 121 (Figures 4–7) is idle. When the operation of the cleaner is to be stopped the button 103 is pushed in. If in so doing the part 99 is stopped by the eccentric because of the relative position of the parts, the stem 101 continues its inward movement until held in its inner position by the spring detent 109. As soon as the eccentric has rotated to a position which permits, the spring 119 projects the extension 99 into the plane of the eccentric, the rotation of which is then available to reciprocate the slider 93. It should be kept in mind that prior to the reciprocation of the slider the lever 123 is to the right of its position shown by Figure 7 and that the pin 129 is not in engagement with the hook 165 but that the movement of the lever will bring the pin into engagement with the hook as shown in Figure 7, illustrating an intermediate position of the lever. When now the slider reciprocates, it first carries with it the rod 141, the spring 153 and the yoke 139, and the lever 123 rotates on its axis, the pin 29 to which the lever is fixed also rotating. During this first stage of slider reciprocation the rake reaches the position shown by Figure 7. At this point the rotation of the lever is stopped by the pawl hook 165 engaging the pin 129. Stopping lever rotation stops movement of the yoke because the yoke is carried by the lever. Since the spring 153 engages the bottom of the yoke this end is held and further reciprocation of the slider under the influence of the eccentric compresses the spring, the end 149 sliding along the rod or shaft 141. Just as the eccentric reaches its extreme position as shown by Figure 4 which, it will be remembered, is the position corresponding to one end position of the cleaner arm in its oscillation, the lug 171 on the slider engages the arm 169 of the pawl and trips the pawl out of engagement with the pin 129 of the lever. The energy which has been stored up in the spring instantly pushes upon the now released yoke which, because of its connection to the lever at 143, swings the lever to the position shown by Figure 6. This swinging of the lever pulls the cable through the instrumentality of the rake 155 and releases the clutch element 71. The release of the clutch stops the drive when the eccentric is at the limiting position and the cleaner arms at the end of their stroke. In fact the arms are somewhat beyond the normally extreme position because the cam 27 on the shaft 29, as the lever rotates, moves the casing itself thereby shifting the shaft 31 bodily and with it the links 39 and 41. In this way the cleaner arms are removed well out of the range of vision of the operator. When it is again desired to use the cleaner the knob 103 is pulled out, lifting the extension from the plane of the eccentric. The spring 133 pulls back the lever and permits the clutch element to reengage. Before the lever has swung to the end of its arc of movement the lug 171 has moved from the pawl, permitting spring 167 to restore the pawl to a position operative to again engage the pin when next the clutch-releasing action is employed.

Figure 14:
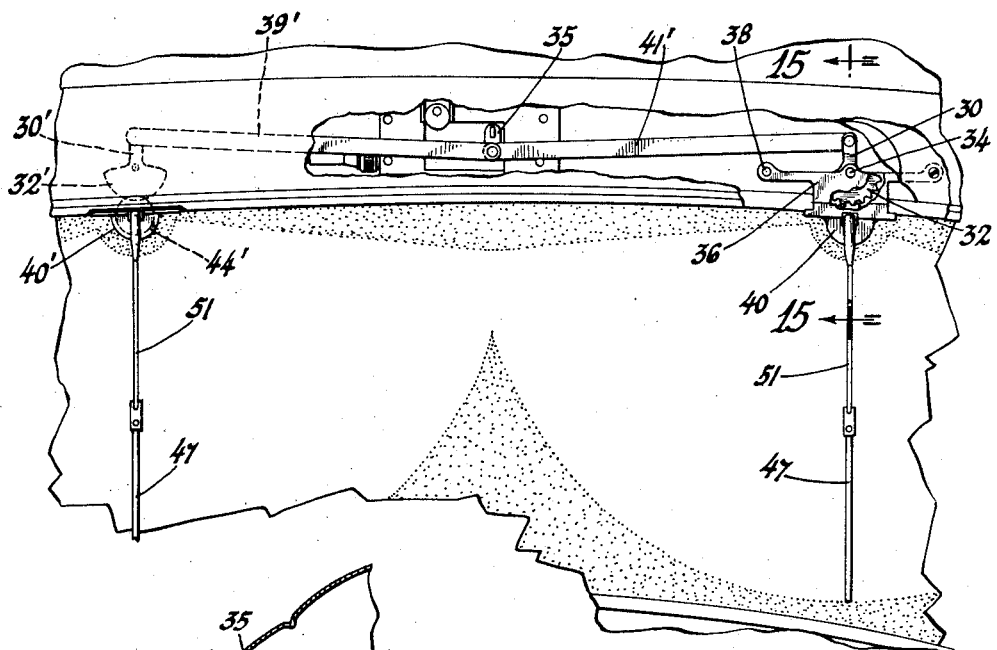
Figure 14 is a front elevation, partly broken away, showing a modified form.
Figure 15:
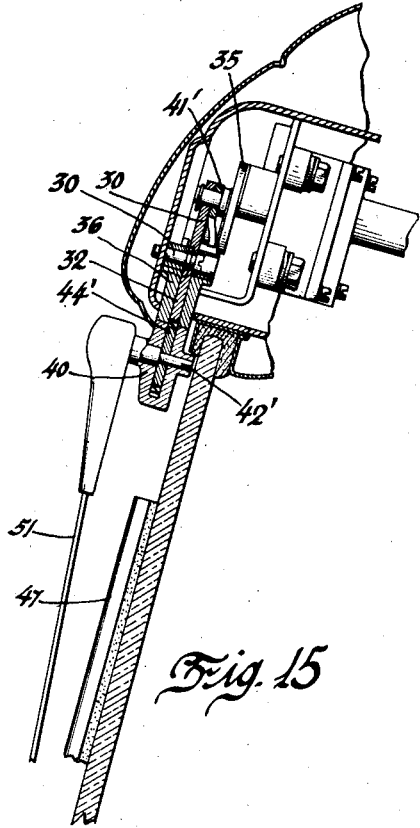
Figure 15 is a section on line 15—15 of Figure 14.
Figure 16:
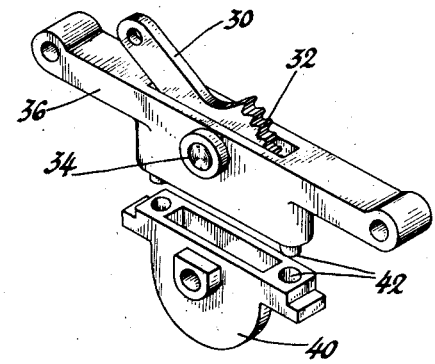
Figure 16 is a perspective of a detail.

Figures 14–16 show a modified form of operating connecting mechanism for the cleaner elements. The links 39' and 41' extend in opposite directions from the crank 35 of the operating unit as before. Link 41' is connected to arm 30 of a segmental gear 32 journaled at 34 in a housing 36 secured at its ends by fastening means 38. A complemental pinion housing 40 is secured as at 42 to housing 36. Housing 40 journals a shaft 42' carrying a pinion 44' meshing with segment 32 as shown by Figure 15. By this means the movements transmitted to the segment by link 41' operates the cleaner in a manner which will be readily understood. In a similar way link 39' operates the gear segment 32', pinion 44', and the other cleaner mechanism.

I claim:

1. In windshield cleaner mechanism for vehicles, a movable cleaner, mechanically driven means for operating said cleaner between predetermined limiting positions and other mechanism selectively engageable with said driven means to move said cleaner to a position beyond its normal range of movement.

2. For use in cleaning a windshield, a cleaner element, a source of power, a mechanical connection between said source of power and said cleaner element for operating the latter between predetermined limiting positions only, means to release said mechanical connection to render the cleaner inoperative, and other means connected to said first means and including a part selectively engageable with said power source, and mechanism actuated thereby to move said cleaner to a position outside its normal range of movement and substantially simultaneously disconnect said mechanical connection.

3. In combination, a movable cleaner element, a source of mechanical power, transmitting means therebetween adapted to move said cleaner element within predetermined limiting positions only, and other mechanism selectively engageable with said transmitting means and operable thereby to render said transmitting means inoperative, and mechanical parts associated therewith to effect a movement of said cleaner element to a position outside its normal range of movement.

4. In combination, a source of power, a rotatable shaft driven thereby, a cleaner actuated by said shaft, a member driven by said shaft, means manually movable into engagement with said driven member and reciprocable thereby, parts movable in response to said reciprocation to disconnect said rotatable shaft from its source of power.

5. In combination, a source of power, a rotatable cable driven thereby, a member driven by said cable, an eccentric on said member, manually operable means selectively engageable with said eccentric, said manually operable means being reciprocated by said eccentric when engaged therewith and parts actuated by said reciprocation to disconnect said rotatable cable from said source of power.

6. In combination, a source of power, a rotatable cable driven thereby, a member driven by said cable, an eccentric on said member, manually operable means selectively engageable with said eccentric, said manually operable means comprising a hinged member permitting engagement and disengagement with said eccentric of one part thereof, the two parts having simultaneous reciprocation under the influence of said eccentric when engaged therewith, and means actuated by said reciprocation to release said cable from connection with said source of power.

7. The invention defined by claim 6, said means including a spring and parts to energize said spring during one part of said reciprocation and to release said spring to effect cable release by another part of said reciprocation.

8. In a windshield cleaner assembly, a source of power, a casing, operating means in said casing, a cable connected to said source of power and to said operating means, a cleaner element supported independently of said casing, a connection between said cleaner element and said operating means whereby the cleaner element is operated between predetermined limits, means to release said cable from said source of power, said means including a rotating shaft journaled in said casing, a cam on said shaft, means manually operated to engage said cam to be moved thereby, and parts operated by the movement of said means to disconnect said cable and to effect a bodily movement of the casing.

9. In a mechanically operated windshield cleaner, a source of power, a cleaner, driving means between said source of power and cleaner including an operating cable, driving connections between said cable and cleaner, a releasable clutch between said cable and source of power, mechanism to release said clutch comprising a lever, a rake pivoted to said lever and operable to pull said cable and release the clutch, a spring to swing said lever to clutch-releasing position, a pawl to engage said lever and hold it against clutch-releasing movement, a slider to sequentially energize said spring and release the pawl to the action of said spring.

10. The invention defined by claim 9 together with means driven by said cable and operable to reciprocate said slider and manually operable means to position said slider for operation by said cable-driven means.

11. The invention defined by claim 9 together with an eccentric driven by said cable and operable to reciprocate said slider, and manually operable means to position said slider for reciprocation by said eccentric.

12. The invention defined by claim 9 together with a second spring operable upon said lever to restore said lever and said first spring to initial positions, and a third spring to reciprocate said cable and engage the clutch with the source of power.

13. The invention defined by claim 9 together with a second spring operable to restore said lever to initial position, means to release said rake from said cable as the lever is restored, and yielding means to engage the clutch upon disconnection of the rake from the cable.

14. The invention defined by claim 9 together with cable-operated means to selectively reciprocate said slider, said cable-operated means occupying a position corresponding with an end position of the cleaner simultaneously with the release of the pawl.

15. In a mechanically operated windshield cleaner, a source of power, a cleaner element, driving means between said source of power and said cleaner element including an operating cable, driving connections between said cable and cleaner, a releasable clutch between said cable and source of power, mechanism to release said clutch, said mechanism comprising a member adapted to be reciprocated by said driving means, operative means energized by the movement of said reciprocating member, a second element actuated by said energized means to engage said cable and release said clutch, and manually operable means to engage said member with said driving means.

16. In a mechanically operated windshield cleaner, a source of power, a cleaner element, an operating cable, driving means between said cable and cleaner, a releasable clutch between said cable and source of power, mechanism to release said clutch, said mechanism comprising a member movable to and from engagement with said cable, yieldable means operable to break said engagement, and other means operable against the tension of said yielding means to effect said engagement, pull said cable, and disconnect said clutch.

17. In combination, a source of power, a rotatable shaft driven thereby, a cleaner actuated by said shaft, a member driven by said shaft, means manually movable into engagement with said driven member and movable thereby, parts movable in response to said first movement to disconnect said rotatable shaft from its source of power.

18. A windshield cleaner having a wiper, a drive member, transmission means operatively connecting the drive member to the wiper for moving the latter back and forth on the windshield, a part movable with the transmission means in a definite path, means operable by said part for interrupting the transmission of power through said transmission means, said interrupting means being normally disposed without the path of said part, and means for operatively relating said interrupting means and said part to effect engagement of said parts and thereby effect an arrest of the wiper.

19. In combination, a source of power, a rotatable shaft driven thereby, a cleaner actuated by said shaft, a part movable with said shaft in a definite path, a spring, means manually movable into engagement with said part for releasing tension on the spring, parts movable by the spring when so released to disconnect said rotatable shaft from its source of power, and means for tensioning said spring.

20. A windshield cleaner having a wiper, a drive member, transmission means operatively connecting the drive member to the wiper for moving the latter back and forth on the windshield in a definite path, means for disconnecting the transmission means from the drive member, means for effecting a movement of the wiper beyond its normal path, and means for operatively relating said second and third mentioned means and means movable with the transmission means, whereby the second and third mentioned means are operated thereby to effect an arrest of the wiper beyond its normal path of movement.

CARLETON J. LAUER.